US009589038B1

(12) United States Patent
Miller et al.

(10) Patent No.: US 9,589,038 B1
(45) Date of Patent: Mar. 7, 2017

(54) ATTRIBUTE TRACKING, PROFILING, AND RECOGNITION

(71) Applicant: Amazon Technologies, Inc., Reno, NV (US)

(72) Inventors: Benjamin Aaron Miller, Issaquah, WA (US); Brian James Schuster, Seattle, WA (US); Therapon Skoteiniotis, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 515 days.

(21) Appl. No.: 14/229,666

(22) Filed: Mar. 28, 2014

(51) Int. Cl.
  *G06F 7/00* (2006.01)
  *G06F 17/30* (2006.01)
(52) U.S. Cl.
  CPC .. *G06F 17/30563* (2013.01); *G06F 17/30324* (2013.01)
(58) Field of Classification Search
  CPC .................................................. G06F 17/30324
  See application file for complete search history.

(56) References Cited

U.S. PATENT DOCUMENTS

2002/0103660 A1* 8/2002 Cramon ................. G06Q 30/06
  709/220
2013/0304604 A1* 11/2013 Hoffman ............ G06Q 30/0621
  705/26.5

* cited by examiner

*Primary Examiner* — Ajith Jacob
(74) *Attorney, Agent, or Firm* — Davis Wright Tremaine LLP

(57) ABSTRACT

Techniques for tracking, profiling and recognizing attributes associated with transactions associated with computer system services. A bitmap representation of the unique identifiers created from name-value pairs of attributes is created and one or more operations are performed on the representation to process the bitmap representation. The one or more operations include operations to, for example, compress the bitmap representation, sub-sample the bitmap representation, locate patterns of attributes within the bitmap representation and other such processing operations. The processed bitmaps may then be further queried to analyze the event data.

20 Claims, 11 Drawing Sheets

ATTRIBUTE TRACKING, PROFILING, AND RECOGNITION

BACKGROUND

Modern computer systems are frequently implemented as a distributed and/or virtualized system comprising a plurality of computer system services operating on a plurality of computer systems using a plurality of computer system resources. Such computer systems may allow connections from a large number of users and/or clients to allow access to the computer system services in order to perform a variety of tasks. Users and/or clients may connect to the computer system services using many different types of devices over a variety of different connection types. When a provider of computer system services wants to track and analyze attributes and/or metadata associated with the connection such as attributes and/or metadata related to the user, the device, the network and/or other such attributes and/or metadata, the provider can be faced with the problem of storing and processing very large data sets in a data store such as a data warehouse. In some computer system environments, where thousands of users may be performing tasks simultaneously, large data sets may be produced and stored in a data warehouse every second. A data warehouse, which may be statically configured in order to facilitate processing the large data sets, may require reconfiguring the data gathering service each time a new device, a new service, a new user type and/or other such new entities with new attributes and/or metadata may join the system. Additionally, a data warehouse may require reconfiguring the data gathering service each time the provider may wish to gather different data, or focus data gathering on a certain attribute subset or perform other types of analysis. Storage and manipulation of the large data sets as well as reconfiguring the data gathering service may be resource intensive, requiring expensive dedicated resources.

BRIEF DESCRIPTION OF THE DRAWINGS

Various embodiments in accordance with the present disclosure will be described with reference to the drawings, in which.

DETAILED DESCRIPTION

Figure 1:
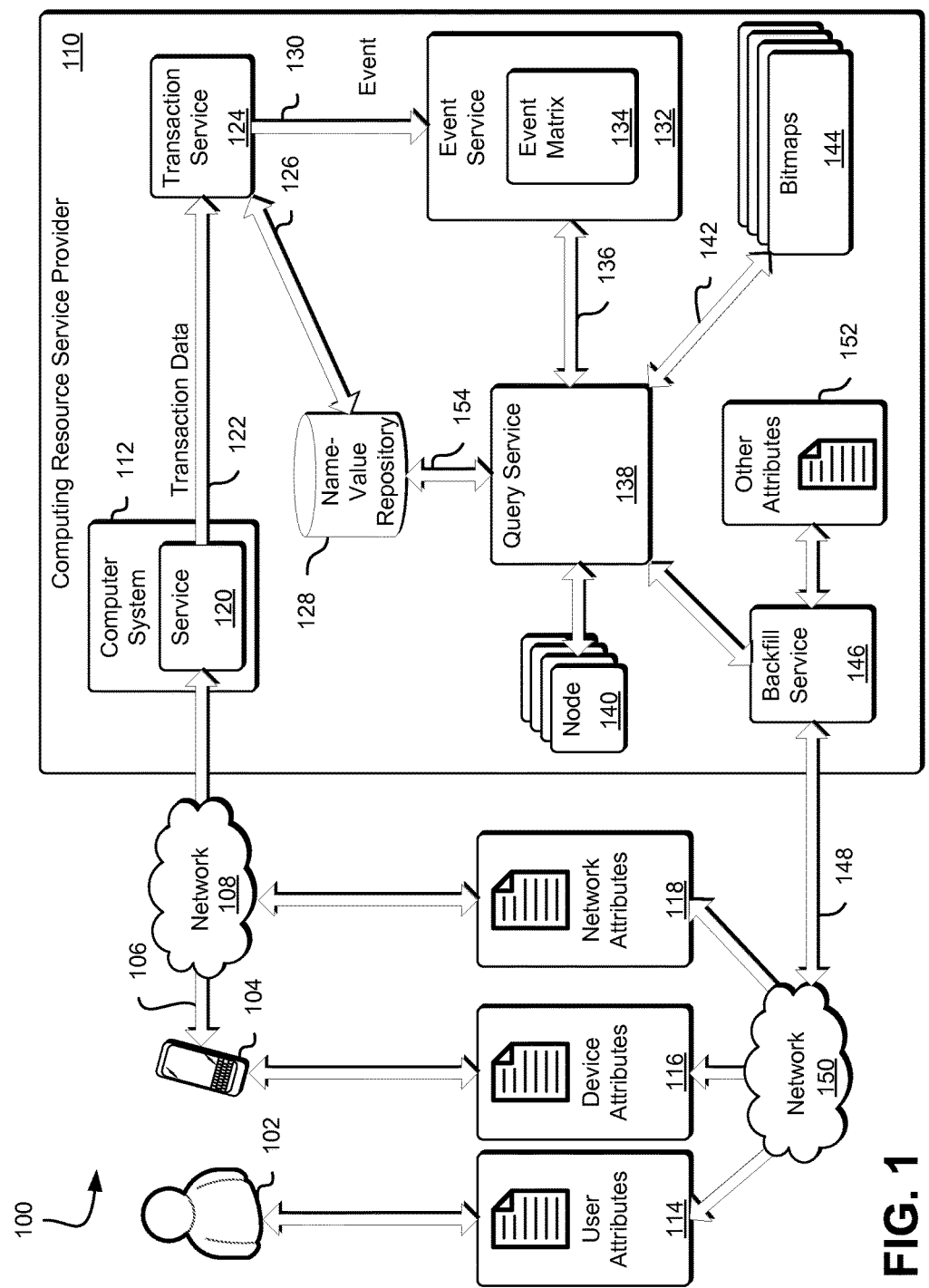
FIG. 1 illustrates an example environment where attribute data may be stored, sorted and analyzed in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include techniques for high-performance gathering, tracking and analyzing computer system service attribute data associated with computer system service users and/or clients within a distributed and/or virtualized computing system environment as well as executable code operating thereon. In particular, techniques are disclosed for utilizing computing system capabilities to gather computer system service transactions and attribute data and/or metadata, accumulate transaction and attribute data and/or metadata name-value pairs, issue and process transaction name-value pair events, create a reduced-sized representation of the accumulated transaction name-value events and analyze the reduced-sized representation of the transaction name-value events in conjunction with the attribute data and/or metadata. Such computing systems may include, but not be limited to, computing systems that consist of distributed sets of a plurality of components, subsystems and resources and may further include, but not be limited to, virtualized and/or non-virtualized components, subsystems and resources. Computing systems with distributed sets of virtualized and/or non-virtualized components, subsystems and resources may be running a variety of services, modules, applications, processes and/or other such computing system entities and may allow connections to those computing system entities by a variety of clients, users, processes, services, modules applications and/or other such connecting computer system entities.

A computer system may be implemented as a distributed and/or virtualized system with a plurality of services. Such computer systems may allow a plurality of connections from a large number of users and/or clients, using a variety of devices and over many different connections such as, for example, the Internet. A provider of computer system services may need to track and analyze attributes and/or metadata associated with the transactions associated with computer system services. For example, a provider of a shopping service targeted to mobile devices may wish to track attributes associated with the usage of the shopping service such as attributes and/or metadata related to the user, the device, the network and/or other such attributes and/or metadata. The provider may wish to know demographic information about the users, what devices that the users may be using, how the users are connecting, which transactions are performed most, what features are used, the complexity of the transaction and/or other such attribute data and/or metadata. In many cases, a provider may use this data, attributes and/or metadata to make decisions about the efficiency of the service, target new services, understand load levels and/or otherwise improve the service and/or the connection to the service.

Such attribute tracking in typical systems may involve tracking the data across multiple dimensions by creating a data warehouse to receive and store transaction attribute data and/or metadata, which is then collected and organized for reporting. As used herein, unless otherwise stated or clear from context, the terms "transaction data" and "transaction attribute data" may be used to refer collectively to data related to the transaction as well as metadata related to the transaction. Data may be sorted and stored based on geographical location of the user and/or client, user preferences, user demographics such as gender, age, and/or other demographics, device type, device version, language, preferred marketplace, activities while connected to the service or a combination of these and/or other such data factors. For some types of data, a data warehousing approach may lead to large data sets, a long delay between gathering the data and producing useable reports, a requirement for expensive resources to store and analyze the large data sets, an inefficient response to changes in data gathering requirements due to the static nature of the data warehouse configuration and/or other such data inefficiencies.

For example, the shopping service targeted to mobile device users mentioned herein above may have a large number of simultaneous users numbering, at peak times, in the tens of thousands. Each user may be engaging in dozens of transactions such as connecting to the service, searching for products, downloading product data, downloading product metadata, uploading product reviews, initiating purchases, completing purchases, disconnecting or other such transactions. Each transaction may have attributes, data and/or metadata associated with the user, the client, the device, the network and/or other such connection items. In such a shopping service, multiple megabytes of attribute data may be produced every second leading to multiple gigabytes of attribute data every hour which must be stored, sorted, analyzed and/or reported.

Techniques described and suggested herein include techniques to store, sort, analyze and produce reports on attribute data using a high performance system which may reduce the amount of attribute data stored by multiple orders of magnitude and which may produce a corresponding increase in the efficiency of attribute data sorting, analysis and/or report generation. A transaction service may be configured to receive and process transactions such as the shopping transactions described herein above. Each transaction may contain one or more pieces of attribute data and/or metadata relating to the transaction. For example, a transaction to connect to a service to initiate a shopping transaction may include attributes such as a user ID, a device ID, a connection type, the transaction type, a time stamp associated with the transaction and/or other such transaction attributes. The transaction may also include metadata associated with one or more of these attributes. For example, the user ID may include metadata about the user such as name, location, nationality, gender, age, birthdate, market preferences and/or other such metadata. The metadata associated with an attribute may be included with the transaction data and/or may be stored in one or more secondary data locations accessible by the service. In some embodiments, a user may enter such metadata upon initially registering an account with the service and then the service may gather such metadata as needed to facilitate data analysis needs. In some other embodiments, the metadata will be derived from, for example, the user's device, survey data, interpolated data, situational data and/or other such data gathering techniques. As may be contemplated, the types of attribute data, the types of metadata and the methods of receiving attribute data and/or metadata illustrated here are examples and other types of attribute data, types of metadata and methods of receiving attribute data and/or metadata may be considered as within the scope of the present disclosure.

Upon receiving a transaction, the transaction service may next begin gathering name-value pairs for attribute data and/or metadata associated with the transaction. Each attribute data and/or metadata item may have a name or identifier and a value for that item. For example, an attribute for a customer with a first name of "Joe" would have a name-value pair of "First Name=Joe". As each name-value pair in a transaction is received, the transaction service may check against a name-value pair repository (such as, for example, a database) to see if that name-value pair has been previously received. New name-value pairs may be entered into the repository and assigned a unique index while previously received name-value pairs may be assigned the previously assigned index. So in the above example, the name value pair of "First Name=Joe" would be assigned the next available unique index if this were the first time a user with a first name of "Joe" engaged in a transaction with the service. Each subsequent user with a first name of "Joe" would have the same unique index assigned to that transaction for that name-value pair. In such a system, new data items may be automatically discovered and entered into the system so that, for example, if a new mobile device manufacturer entered the marketplace, the identifiers for that manufacturer may be automatically discovered and added to the transaction service upon the first connection from the first user of such a new device.

After each name-value pair is associated with a unique identifier from the name-value pair repository, the name-value pair identifiers may be collected into an event associated with the transaction. The event may include an event identifier, an event time stamp, an event type and one or more name-value pair identifiers corresponding to the attribute data and/or metadata associated with the transaction. The events may then be aggregated into a matrix wherein each column of the matrix may represent a single event and each row of the matrix may represent a single name-value pair identifier. Such a matrix may relate events to name-value pair identifiers, and thus to name-value pairs by indicating, for each event (column), the name-value pairs associated with that event and for each name-value pair (row), the events that that name-value pair is associated with. In some embodiments, the events may be aggregated by configuring the transaction service to create an event bus, the event bus configured to issue the events which may then be received and processed by one or more event processing services running within the computer system. In some embodiments, the events may be aggregated directly by the transaction service.

The aggregated events may then be further processed be creating a bitmap of the data represented by the aggregation matrix. A bitmap may be a data representation mapping one or more values to one or bit-values as described herein. In some embodiments, the event data may be directly aggregated into the bitmap without intermediate storage in the matrix. The bitmap may be constantly grown as new events are received, or may be collected and aggregated for a set time period, or may be collected and aggregated for a certain number of samples or may be collected and aggregated according to some other organization of the data. For example, a bitmap that records the events for the previous thirty minute period may have one column for each event that occurred during that thirty minute period and may have one row for each unique name-value pair that occurred during that thirty minute period. A bit value of one for a particular row and column may indicate that the corresponding name-value pair (the row) was associated with the event (the column). The bitmap, combined with the name-value pair repository may be a lossless representation of the transaction data as, for each event, the name value pairs associated with that event may be determined and thus, the transaction data may also be determined.

One or more services running on the computer system may then further process the aggregated data bitmap by, for example, compressing the data. Image processing techniques such as run-length encoding or various mathematical transformations may be used to compress the bitmap, reducing the bitmap data size. In some embodiments, the image compression may be required to be lossless to preserve the source data. In some embodiments, some lossy compression techniques may be allowed. Frame-to-frame and/or other movie compression techniques may also be used to compress the data, using frame-to-frame coherence and/or other properties of a collection of aggregated data bitmaps. Sampling of the data such as time-based sampling and/or statistically-based sampling may be used to further reduce the size of the aggregated data bitmaps. Such sampling may be used when, for example, the aggregated data bitmaps are sparse. Other data processing techniques to reduce the data size may be used such as, for example, normalizing the data of time based at least in part on data patterns, gathering data types or event types into data regions, compressing or aggregating data across similar events and/or similar attributes, pruning unneeded data and/or other such processing techniques. As may be contemplated, the data processing techniques described herein are illustrative examples and other such data processing techniques may be considered as within the scope of the present disclosure.

Compressed aggregate data bitmaps may then be used to analyze usage patterns related to the users of the service, using a query service. In some embodiments, bitmap comparisons between regions of the aggregated data bitmaps, even if compressed, may be used to locate data usage patterns which may then be used to make business decisions. For example, if each time a certain best-selling product is updated, the aggregated data bitmaps show that there is a large upswing in transactions from a certain marketplace, the service provider may determine that doing a system update that prevents access from that marketplace immediately after updating that best-selling product may lead to a degraded customer experience. Similarly, if customers from one geographical region take twice as many steps to complete a sales transaction as compared to customers from another geographical region, the data showing this fact may be an indicator that the instructions in the language used in that region are faulty, misleading and/or confusing.

FIG. 1 illustrates an example environment 100 where one or more computer systems running within a computing resource service provider environment, as well as the associated code running thereon, may be used to store, sort, analyze and produce reports on attribute data. A user 102 may connect 106 to a computer system instance 112 through a computer system client device 104 and may initiate a connection with and/or interaction with one or more applications running on the computer system instance 112. The computer system instance 112 may be operating within a computing resource service provider 110. In some embodiments, the computing resource service provider 110 may provide a distributed, virtualized and/or datacenter environment within which one or more applications, processes, services, virtual machines and/or other such computer system entities may be executed. In some embodiments, the user 102 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 104, or may originate as a result of an automatic process or may originate as a result of a combination of these and/or other such origin entities. In some embodiments, the command or commands to initiate the connection 106 to the computing resource service provider 110 may be sent to the computer system instance 112, without the intervention of the user 102. The command or commands to initiate the connection 106 to the computer system instance 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The user 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the computer system instance 112 may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes or other such networks. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

The user 102 may connect to a service 120 which may be one of a plurality of services running on one or more computer system 112 instances within a computing resource service provider 110. The service 120 may be a back-end service, or data provider service, or a web service or a combination of these and/or other such services. The service 120 may report data associated with one or more transactions 122 received from the user 102 of the computer system client device 104 via the network 108 over the connection 106. The data associated with the one or more transactions 122 may include data and/or transaction metadata relating to the user 102, to the device, 104, to the network 108, to the service 120 or to a combination of these and/or other such entities associated with the one or more transactions 122. For example, the data associated with the one or more transactions 122 (also referred to herein as "transaction data") may include a user identifier (user ID) for the user 102 which may be a previously established user ID associated with the user 102, or may be a dynamically generated user ID associated with the user 102 or may be some other such user ID. In another example, the transaction data may include a device identifier (device ID) for the computer system client device 104 which may be a previously established device ID based at least in part on the device manufacturer, the device model, the device operating system, the device instance or a combination of these and/or other such device data. As may be contemplated, the transaction data items described herein are illustrative examples and other such transaction data items may be considered as within the scope of the present disclosure.

In some embodiments, the transaction data associated with the one or more transactions 122 may be based at least in part on one or more user attributes 114. The user attributes 114 may be stored in a location accessible by the service 120 or may be stored in a location accessible by one or more other services, modules, applications, processes and/or other such computer system entities operating on, under the control of or accessible by the computing resource service provider 110. Access to the user attributes may be based at least in part on one or more data items contained in the transaction data associated with the one or more transactions 122. For example, as mentioned herein above, the transaction data associated with the one or more transactions may include a user ID. In such an example, the service may access additional user information such as a user name, user demographics such as gender or age, user preferences, user purchase data or other such user attributes based at least in part on the user ID. Such user attributes 114 may be received by the service 120 from another service or services connected to and/or otherwise accessible by the service 120. The transaction data associated with the one or more transactions 122 may also be based at least in part on one or more device attributes 116 and/or on one more network attributes 118. The device attributes 116 and/or the network attributes 118 may also be stored in a location accessible by the service 120 and/or by one or more other services as described herein.

An interaction between a user and a service may include a plurality of transactions. For example, a user interacting with the shopping service described herein above to make a purchase may initiate a series of transactions to make the purchase. Such transactions may include, but not be limited to, connecting to the service, logging in, sending user preferences, displaying a home page based on preferences, searching for a product, receiving the search results, selecting a product to purchase, transferring the selected product to a shopping cart, entering credit card information, entering shipping information, completing the purchase, logging out and/or other such transactions. In such an example, some of the transaction data may remain static while some of the transaction data may be mutable. For example, each transaction may include a transaction identifier (transaction ID) associated with the type of transaction (e.g. logging in, sending user preferences and so on) which may change with each transaction. Similarly, the user may be moving from place to place and so a location of the user or a network identifier (network ID) may change as the user moves within a network.

The transaction data associated with the one or more transactions 122 may be received from the service 120 by a transaction service configured to receive and process the transaction data. The transaction service 124 may receive the transaction data and may first identify one or more transaction data name-value pairs contained in the transaction data. For example, a user attribute item associated with the transaction data may indicate that the user 102 is female. The name value pair for such an attribute item may be "Gender=Female" for the user 102. Each transaction data item (including the data items from the user attributes 114, the device attributes, the network attributes 118, the transaction data, the transaction metadata or other such data items) may result in the identification of a name-value pair.

The transaction service 124 may then query 126 a name-value repository 128 to determine whether one or more of the identified name-value pairs may have been previously identified by the transaction service 124. The transaction service 124 may determine whether one or more of the identified name-value pairs may have been previously identified by the transaction service 124 by searching for an entry in the name-value repository 128 corresponding to the name-value pair. For those name-value pairs that have not been previously identified by the transaction service 124, the name-value repository 128 may create a new entry in the name-value repository 128 corresponding to the name-value pair including a unique identifier associated with the new entry in the name-value repository 128. In some embodiments, the unique identifier associated with the new entry in the name-value repository 128 may be associated with the new entry by assigning a monotonically increasing value for each new entry. In such an embodiment, the first name-value pair identified may be assigned an identifier of one; the second name-value pair identified may be assigned an identifier of two and so on. In some embodiments, the name-value repository may assign unique identifiers based on some other schema such as by using database keys, globally unique identifiers (GUIDs) or some other such identifying schema. Those name-value pairs that have been previously identified by the transaction service 124 may have the previously assigned unique identifier returned as a result of the query 126.

The transaction service 124 may then create an event 130 comprising at least a subset of the unique identifiers associated with the name-value pairs contained in the transaction data. The event 130, which may include an event identifier and may include event metadata such as the type of the event or a timestamp corresponding to the transaction may include each of the unique identifiers associated with the name-value pairs contained in the transaction data or may include a reduced subset of the unique identifiers associated with the name-value pairs contained in the transaction data. In some embodiments, the transaction service 124 may be configured to remove some of the unique identifiers associated with the name-value pairs contained in the transaction data and stored in the event 130 in order to reduce the data size, or to focus a query based on specific data such as data related to certain services, users, user demographics, locations, devices, networks and/or other such data, or to focus a query based on certain business needs or based on a combination of these and/or other such reasons. In some embodiments, an event 130 may be created by, for example, placing the event in an event queue which may issue the events to be received by an event service 132. In some embodiments, an event 130 may be created and sent directly to an event service 132. In some embodiments, the event service 132 and the transaction service 124 may be the same service.

A plurality of events may be collected by an event service 132 to build an event matrix 134. Each column of the event matrix 134 may comprise a single event 130. The rows of the event matrix 134 may correspond to the unique identifiers contained in the name-value repository, with one row for each unique identifier. For each event 130 received by the event service 132, if the event contains a unique identifier, an value of one may be entered in the matrix entry corresponding to that row indicated by the unique identifier, for the column corresponding to the event. For example, if an event contains unique identifiers one, three, seven and fifteen, a value of one may be entered in the first, third, seventh and fifteenth rows of the column corresponding to the event and values of zero may be entered for the other rows. As new events with new unique identifiers are received by the event service, new rows corresponding to those unique identifiers may be added to the event matrix 134.

The data in the event matrix may then be used as the basis for producing one or more bitmaps 144. A query service 138 may update 142 the bitmaps 144 based at least in part on the event matrix 134. The query service 138 may also update the event matrix 134 and/or the bitmaps 144 using additional attribute data obtained from a backfill service 146. The backfill service 146 may query 148 the user attributes 114, the device attributes 116 and/or the network attributes 118 via a network 150 which may, in some embodiments, be the same as the network 108. The backfill service 146 may also query other attributes 152 from one or more computing systems, services, applications, processes, modules and/or other such computing system entities that may be used to further characterize the transaction and/or event data. For example, an event may be characterized by an operating system type of a particular service if a business unit desires such information. The operating system type of the particular service may be queried by the backfill service and that information included in the event along with the other attributes 152. In some embodiments, the query service 138 may use the attributes obtained by the backfill service 146 and may obtain 154 new name-value pair identifiers from the name-value repository 128, allowing entry of the new attributes in the event matrix 134 and/or in the bitmaps 144.

The one or more bitmaps 144 may be produced from the event matrix 134 by, for each non-zero value in the event matrix 134, a corresponding pixel in the bitmap may be turned on. In some embodiments, the data from the transaction service 124 and the data from the backfill service 146 may be written directly to the bitmaps 144 by the query service 138, without writing to an event matrix 134. The data and/or the event matrix 134 may be used to produce bitmaps 144 on a periodic basis (for example, every thirty minutes), or after a certain number of events have been received, or as a result of having received a specific event, or after a certain total aggregation of event data has been received, or as a result of receiving a signal from a service such as the transaction service 124 and/or the query service 138, or for business reasons or as a result of these and/or other such conditions. The query service 138 may process the events using one or more data processing nodes 140 so that data may both be received and processed at the same time. The data processing nodes 140 may timeslice the data (separate by time), or may shard the data (separate by category as described herein below) or process the data in some other such manner. The query service 138 may also use one or more data processing nodes 140 to further process the bitmaps 144 by, for example, compressing, normalizing, subsampling, statistically sampling, image reconstruction, image comparison and/or other such techniques. As may be contemplated, the bitmap processing techniques described herein are merely illustrative examples and other such bitmap processing techniques may be considered as within the scope of the present disclosure.

To further aid in processing of the event data, the query service 138, the event service 132 and/or the transaction service 124 may specify one or more categories associated with the events. For example, a transaction relating to a user purchase may be in a different event category than a transaction relating to a user creating an account. Similarly, a new computer system client device 104 associated with a user 102 and/or adding a corresponding new set of device attributes 116 may be a different event category that a device migrating from one network location to another network location. The categories may be stored in the name-value repository 128 or may be stored in a separate location accessible by the transaction service 124, the event service 132 and/or the query service 138. Categories may be used to improve the efficiency of storing, processing, scaling and/or reporting the events. Other types of event categories may also be specified and each event may be associated with one or more of the categories, allowing multiple categorizations of events. For example, one or more errors may be received by the transaction service 124, and those errors may be processed and/or categorized as error events. The event categories may be transactional, informational, functional or a combination of these and/or other such category types. Events may be further categorized by event aggregations, event combinations, event category operations, event namespaces, event meta-categories (categories of categories) and/or other such event categorization types. As may be contemplated, the event categories and event categorization methods described herein are merely illustrative examples and other such event categories and event categorization methods may be considered as within the scope of the present disclosure.

The query service 138 may further process the bitmaps 144 by performing a plurality of queries associated with the bitmaps. The queries, which may be based on binary operations associated with the compressed, normalized and/or otherwise processed bitmaps, may be done in real-time, allowing multiple simultaneous queries relating to a plurality of events, event categories, event types and/or other such event specifications. For example, the query service 138 may issue a plurality of queries to determine peak usage of a certain device type from a certain marketplace by comparing binary data representing the device type and marketplace identifiers against the bitmaps. The query may yield a set of one or more events which may also be represented in a bitmap or in a collection of bitmaps. The set of one or more events may then be further queried for secondary and/or related event information.

Figure 2:
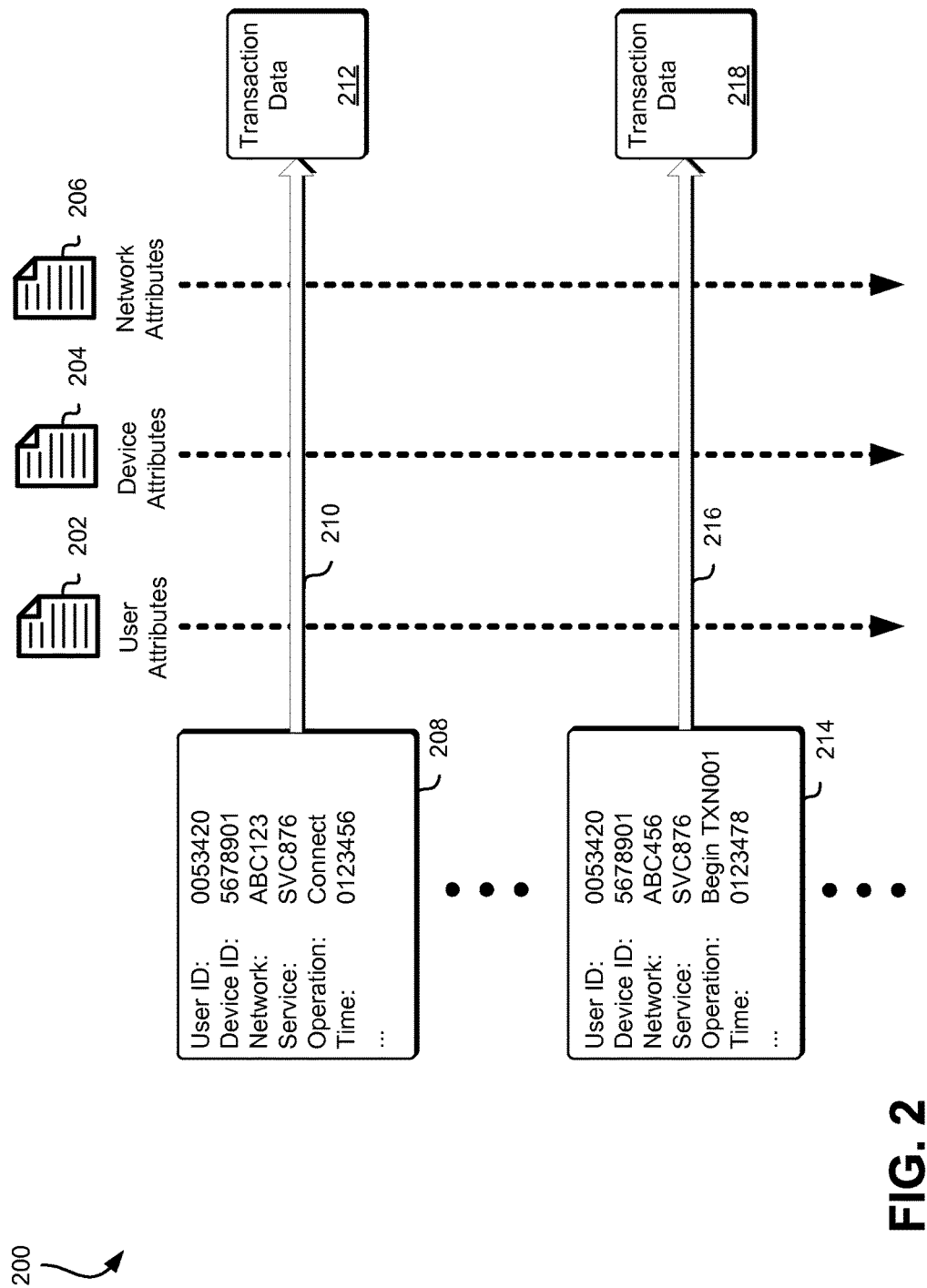
FIG. 2 illustrates an example environment where data and/or attributes relating to one or more transactions may be compiled into transaction data in accordance with at least one embodiment.

FIG. 2 illustrates an example environment 200 where data and/or attributes relating to one or more transactions may be compiled into transaction data for further processing as described herein at least in connection with FIG. 1 and in accordance with at least one embodiment. A transaction 208 may be initiated by a user or some other such computer system client entity, the client entity which may be connected to a service using a device as described herein. A transaction such as the transaction 208 may include data items such as, for example, a user ID, a device ID, a network, a service, an operation, a time or a combination of these and/or other such data items. The data may be collected 210 and combined with additional data items including, but not limited to, user attributes 202, device attributes 204, network attributes 206 or other such attributes, to produce transaction data 212. A transaction such as the transaction 214 may also include data items such as, for example, a user ID, a device ID, a network, a service, an operation, a time or a combination of these and/or other such data items which may also be collected 216 and combined with additional data items to produce transaction data 218. In some embodiments, the type and/or number of data items contained in a transaction such as transaction 214 may differ from the type and/or number of data items contained in a transaction such as transaction 208. The type and/or number of data items contained in a transaction may be based on system conditions, business needs, customer and/or provider policies and/or other such considerations.

Data such as the user attributes 202, the device attributes 204, the network attributes 206 and/or other such data may be combined with the data in the transaction 208 and/or may be combined with the data in the transaction 214 based at least in part on the contents and/or values of data items contained in the transaction 208 and/or the transaction 214. Data such as the user attributes 202, the device attributes 204, the network attributes 206 and/or other such data may be combined with the data in the transaction 208 and/or may be combined with the data in the transaction 214 based at least in part on data items contained in other locations within the computer system such as, for example, an external data store, a system policy repository, a user policy repository, a business policy repository or other such locations. As may be contemplated, the types of data contained in the transaction data, the methods for gather such data, the locations of such data and/or the policies regarding gathering such data described herein are illustrative examples and other such data, methods, locations and/or policies may be considered as within the scope of the present disclosure.

Figure 3:
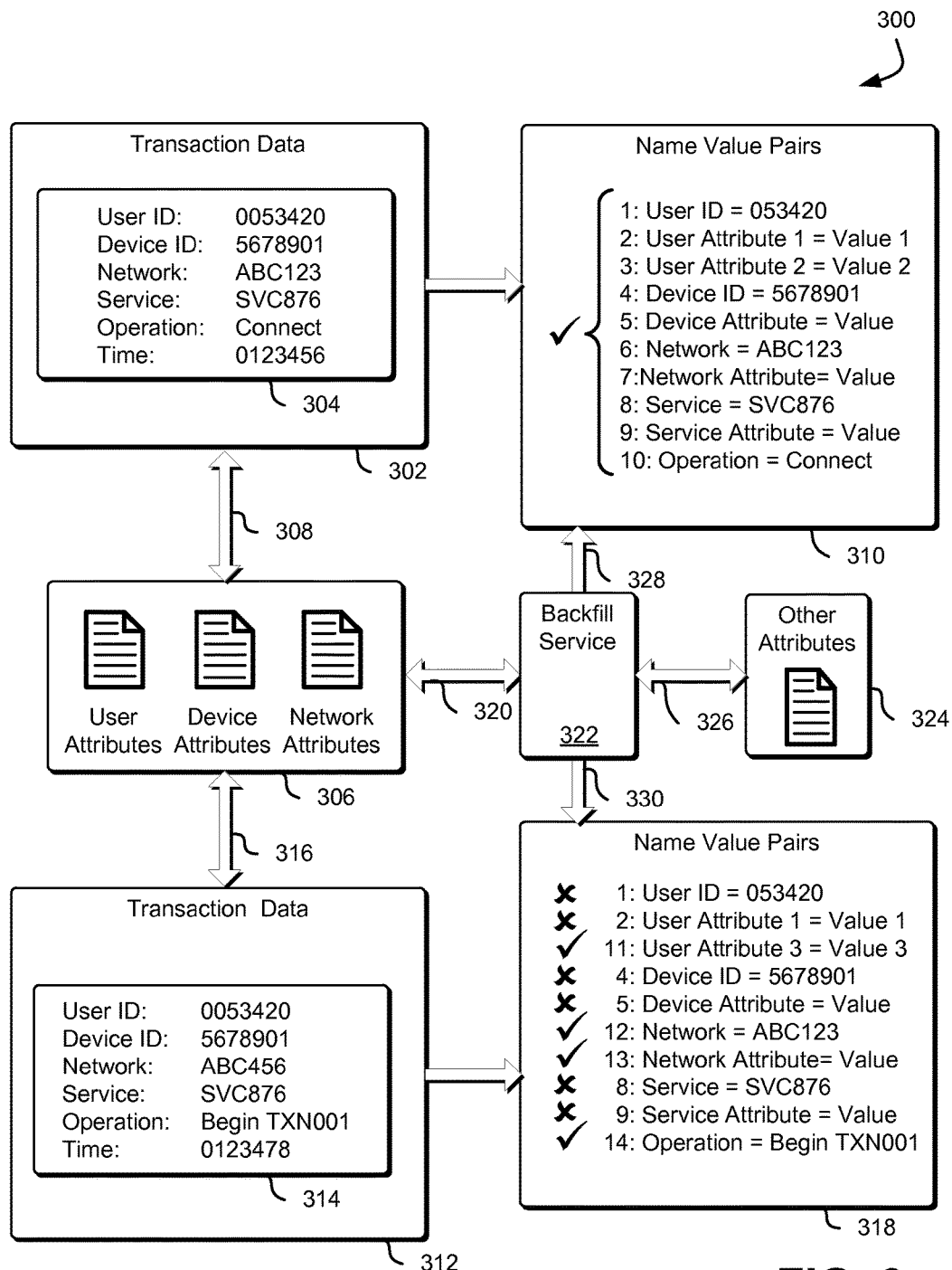
FIG. 3 illustrates an example environment where name-value pairs may be identified from transaction data in accordance with at least one embodiment.

FIG. 3 illustrates an example environment 300 where name-value pairs may be identified based at least in part on transaction data as described herein at least in connection with FIG. 1 and in accordance with at least one embodiment. Transaction data such as transaction data 302 may contain data from a transaction 304 and/or event-time attribute data 308 from attributes 306 as described herein at least in connection with FIG. 2 and in accordance with at least one embodiment. The event-time attribute data 308 may be attribute data that is available at the time of the transaction. One of more name-value pairs 310 may be identified from the transaction data 302 and each name-value pair of the one or more name-value pairs 310 may be assigned a unique identifier based at least in part on determining whether the name-value pair was identified from a previous transaction by a service such as a transaction service 124 (as described herein at least in connection with FIG. 1) and stored in a name-value repository such as name-value repository 128 (also as described at least in connection with FIG. 1). One or more additional name-value pairs may be later determined and/or stored in the name-value repository such as name-value repository 128 by a backfill service 322 which may gather additional attributes 320 from the attributes 306 and which may also gather additional attributes 326 from the other attributes 324 as described herein at least in connection with FIG. 1 and in accordance with at least one embodiment.

In the example illustrated in FIG. 3, each name-value pair of the name-value pairs 310 was not identified from a previous transaction and so each name-value pair of the name-value pairs 310 may be assigned a unique identifier (in this example, the numbers one to ten). Subsequent transaction data such as transaction data 312 may contain data from a transaction 314 and/or event-time attribute data 316 from attributes 306 as described herein at least in connection with FIG. 2 and in accordance with at least one embodiment. One or more name-value pairs 318 may be identified from the transaction data 312 of transaction 314. The name-value pairs 318 may include one or more name-value pairs that were identified from a previous transaction by a stored in a name-value repository. The name-value pairs 318 may also include one or more name-value pairs that were not identified from a previous transaction and were not stored in a name-value repository. The name-value pairs 318 may also include one or more attributes 330 provided by the backfill service 322 as described herein above. In the example illustrated in FIG. 3, four of the name-value pairs of the name-value pairs 318 were not identified from a previous transaction and may be assigned a unique identifier (in this example, the numbers eleven to fourteen).

Figure 4:
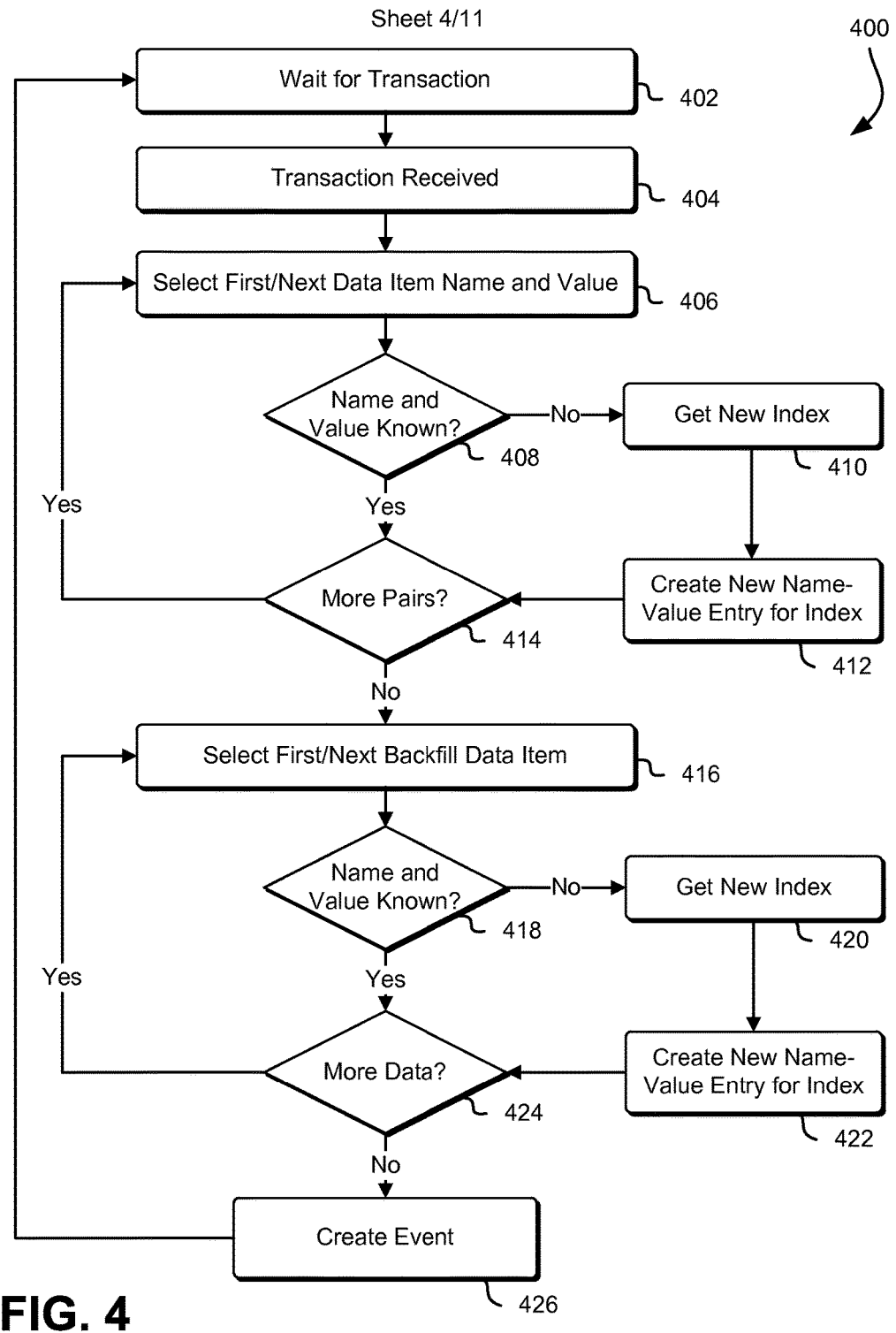
FIG. 4 illustrates an example process for identifying name-value pairs from transaction data in accordance with at least one embodiment.

FIG. 4 illustrates an example process 400 for identifying name-value pairs from transaction data as described herein at least in connection with FIG. 1 and in accordance with at least one embodiment. A transaction service such as the transaction service 124 described herein at least in connection with FIG. 1 may perform at least a portion of the process illustrated in FIG. 4. A backfill service such as the backfill service 146 described herein at least in connection with FIG. 1 may perform at least a portion of the process illustrated in FIG. 4. Other entities operating within a computing system may also perform at least a portion of the process illustrated in FIG. 4 including, but not limited to, services, applications, modules, processes, operating system elements, virtual machine elements, network hardware, controlling domains (e.g. a hypervisor) or combinations of these and/or other such entities operating within the computing system.

A service such as a transaction service may wait for a transaction 402, and when a transaction is received 404 may begin identifying name-value pairs from the transaction data in the transaction by selecting the first data item name and value 406. The data item name and value may be selected in a determined order, or based upon one or more selection criteria such as, for example, first selecting all data relating to the user, or selected randomly or selected according to some other such selection order. The service such as a transaction service may then determine if the name and the value are known 408 due to, for example, having been identified from a previous data item name and value in this or in a previous transaction. Previously identified names and values may be stored and/or searched for within a repository of name-value pairs based on an indexing of the name-value pair, or based on indexing first the name and then the value, or based on indexing first the value and then the name, or based on a hash of the name-value pair, or based on a hash of first the name and then the value, or based on a hash of first the value and then the name, or based on a GUID, or based on a lookup table, or stored with a generated index in a structureless system or based on some other such storage and/or search schema. Name and value combinations that are not known may be identified for storage and/or searching by first getting a new index 410 for the name-value pair and second by storing the name-value pair with the index in a name-value repository 412. The process of selecting names and values from the transaction data may continue while there are more pairs 414 to identify.

In some embodiments, name-value pairs may be further enhanced by attribute data provided by a backfill service as described herein at least in connection with FIG. 1 and in accordance with at least one embodiment. The first backfill data item may be selected 416, checked against a name-value pair repository 418 and, if not known, a new index may be provided 420 and a new entry placed in the repository 422. This process may continue while there are more data pairs 424 to identify. The collected name-value pair identifiers may then be used to create an event 426 as described herein at least in connection with FIG. 1. In some embodiments, the addition of new backfill data to the event may continue after the event is created.

Figure 5:
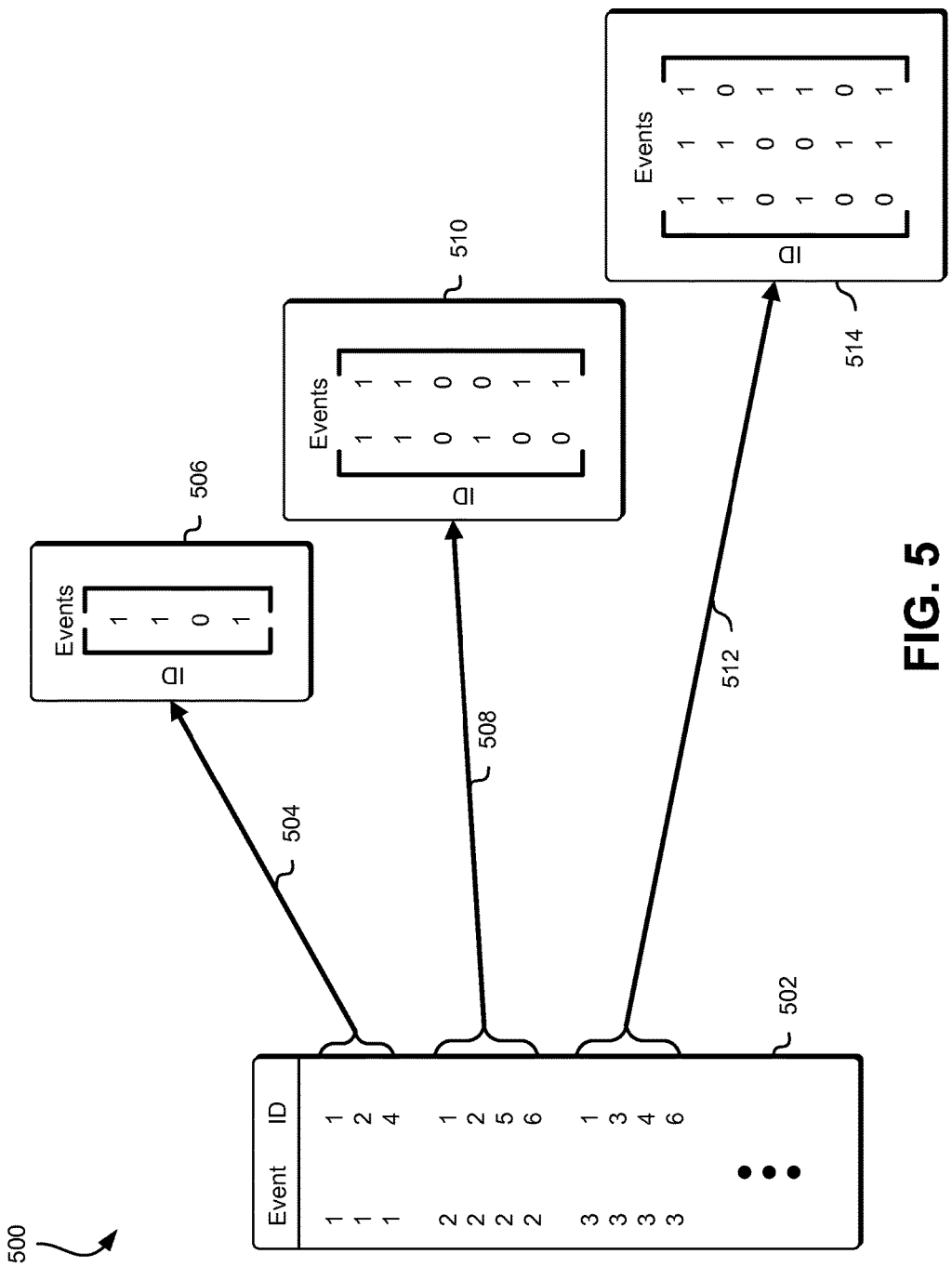
FIG. 5 illustrates an example environment where an event matrix may be created from events in accordance with at least one embodiment.

FIG. 5 illustrates an example environment 500 where an event matrix may be created from events as described herein at least in connection with FIG. 1 and in accordance with at least one embodiment. A collection of events 502, each comprising a collection of unique identifiers may be used to create an event matrix with, for example, with the events stored in the columns of the matrix and with values in the columns indexed by the unique identifiers. A first single event 504 of from the collection of events 502 may be used to create an event matrix 506 with a single column representing the single event 504. Entries in the rows of the event matrix 506 correspond to the unique identifiers (ID) in the single event 504 (one, two and four in this case, with no entry in row three). A second event 508, with two new unique identifiers (five and six) may add two new rows to the event matrix 510 and one new column to the event matrix 510 representing the new event. A third event 512, may add a new column to the event matrix 514 representing the new event.

Figure 6:
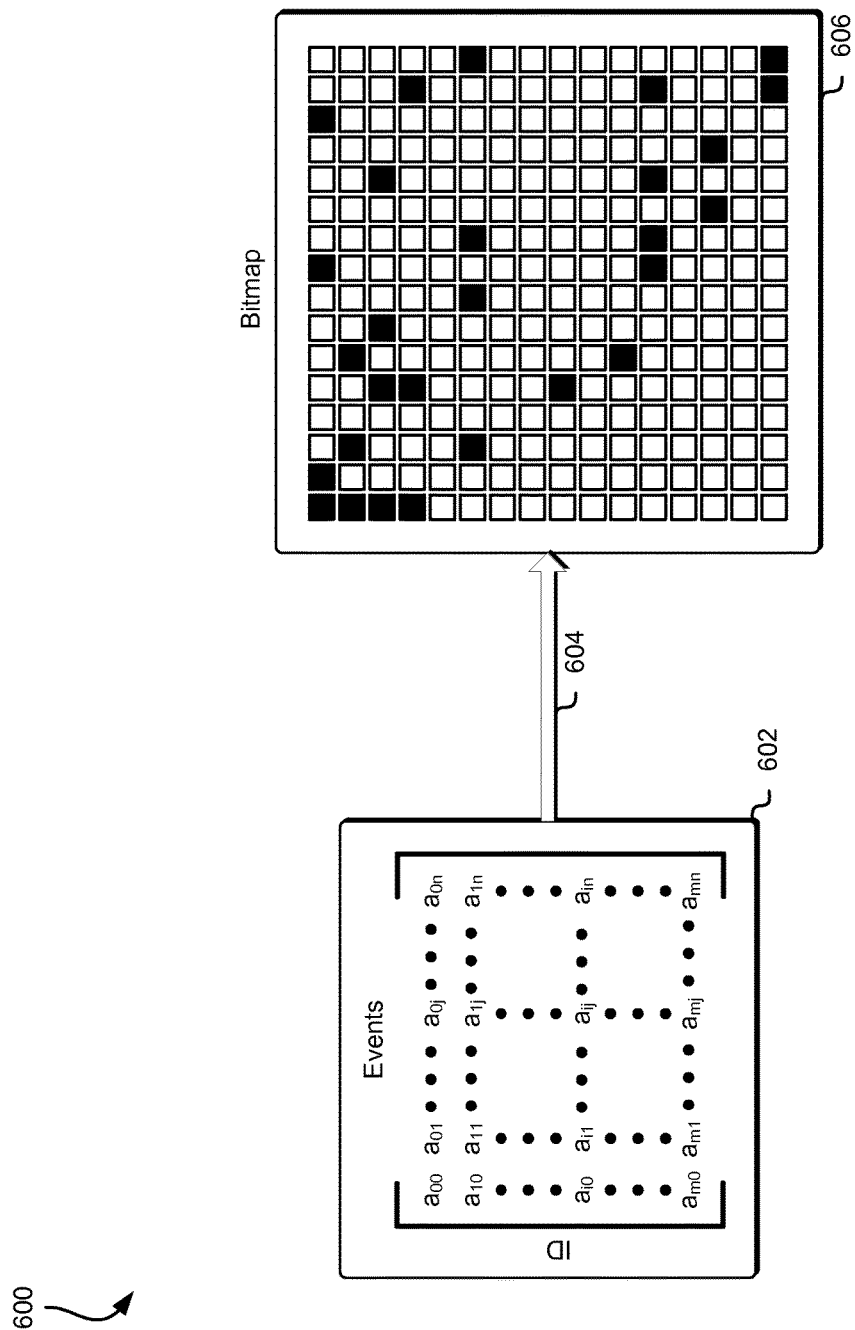
FIG. 6 illustrates an example environment where a bitmap may be created from an event matrix in accordance with at least one embodiment.

FIG. 6 illustrates an example environment 600 where a bitmap may be created from an event matrix as described herein at least in connection with FIG. 1 and in accordance with at least one embodiment. The event matrix 602 may be used to create 604 the bitmap 606 by, for each value stored in the matrix, determining the row and column in the bitmap corresponding to row and column in the matrix. A bitmap may contain two states variously described as "on and off", "one and zero" or "true and false". In the example illustrated in FIG. 6, if a non-zero value is stored in the matrix the corresponding bit may be set to "on" in the bitmap (represented by a black square) and if a zero value is stored in the matrix the corresponding bit may be set to "off" in the bitmap (represented by a white square). In some embodiments, the bitmap may be set in an opposite manner so that non-zero values in the matrix result in an "off" value in the bitmap and zero values in the matrix result in an "on" value in the bitmap. In some embodiments, there may be a mapping between the order of the rows and/or columns in the matrix and the rows and/or columns in the bitmap. For example, the rows and columns may be swapped so that rows in the matrix correspond to columns in the bitmap and columns in the matrix correspond to rows in the bitmap. In another example, the rows and/or the columns may be inverted, so that, for example, the first row in the matrix corresponds to the last row in the bitmap and the last row in the matrix corresponds to the first row in the matrix. In some embodiments, the data from the events may be written directly to the bitmap, without writing to a matrix as described herein at least in connection with FIG. 5. It should be noted that while the bitmaps shown herein are illustrated with "on" bit values shown as black squares and "off" bit values shown as white squares, this is merely for illustrative purposes.

The bitmap 606 and/or the matrix 602 may be very sparse, containing a limited amount of data for a particular row, column and/or other such region. In one particular time period such as, for example, an off-peak time period, a large number of events may occur with no events relating to a particular attribute. For example, during an early morning time period for a particular marketplace, no transactions of a particular type may occur. Similarly, in a service with, for example, millions of attributes and thousands of transactions per hour, an event related to a particular user (which may be unique name-value pair identifier) may occur one time in billions of samples. Such sparse data may be efficiently compressed in a lossless manner as removing a large number of zero values from a bitmap representation may be highly efficient and lossless.

Figure 7:
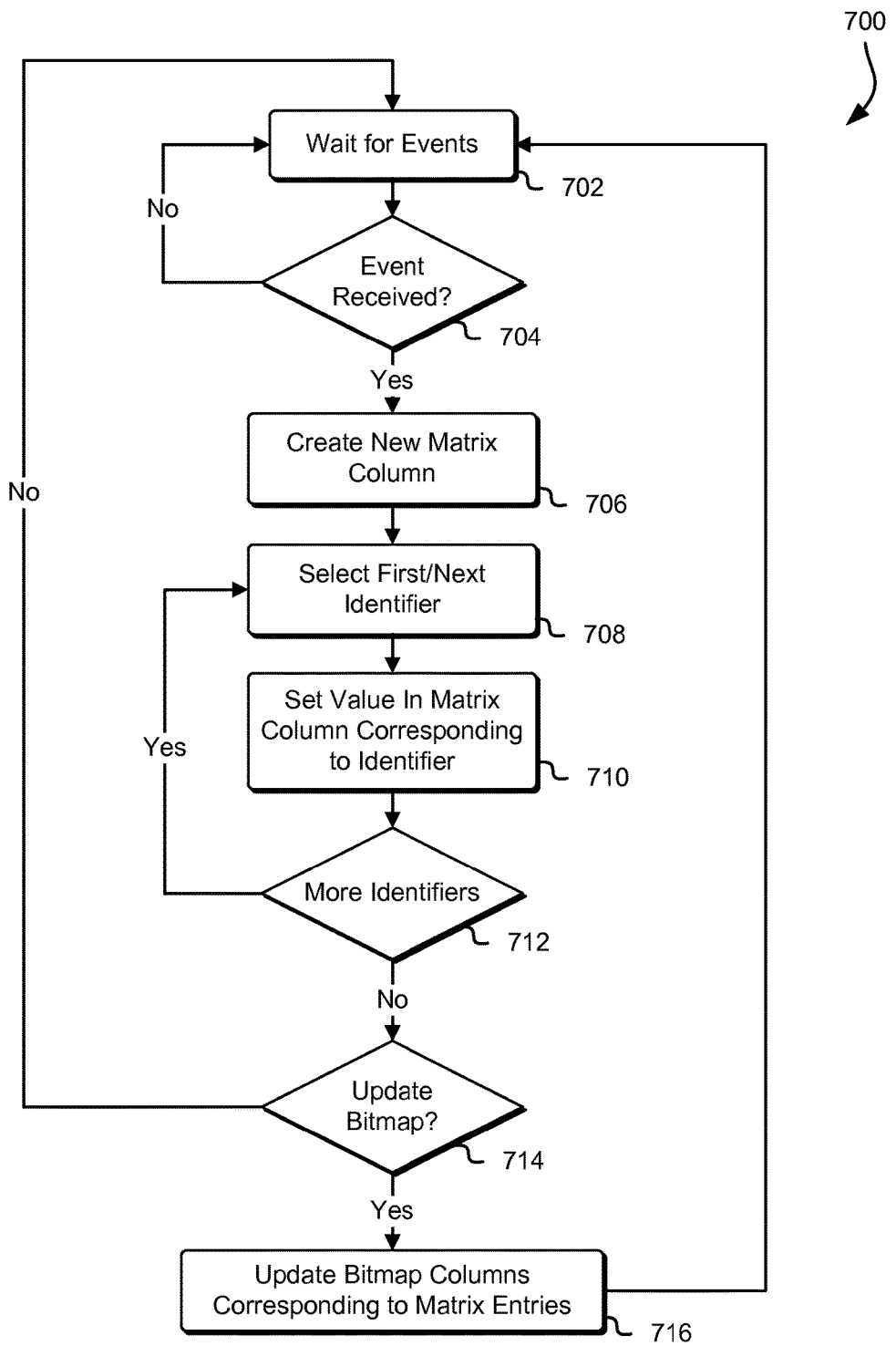
FIG. 7 illustrates an example process for creating a bitmap from an event matrix in accordance with at least one embodiment.

FIG. 7 illustrates an example process 700 for creating a bitmap from an event matrix as described herein at least in connection with FIG. 1 and in accordance with at least one embodiment. A transaction service such as the transaction service 124 described herein at least in connection with FIG. 1 may perform at least a portion of the process illustrated in FIG. 7. An event service such as the event service 132 described herein at least in connection with FIG. 1 may perform at least a portion of the process illustrated in FIG. 7. A query service such as the query service 138 described herein at least in connection with FIG. 1 may perform at least a portion of the process illustrated in FIG. 7. Other entities operating within a computing system may also perform at least a portion of the process illustrated in FIG. 7 including, but not limited to, services, applications, modules, processes, operating system elements, virtual machine elements, network hardware, controlling domains (e.g. a hypervisor) or combinations of these and/or other such entities operating within the computing system.

An event service such as event service 132 described herein may first wait for events 702 and, when an event is received 704 a new matrix column may be created 706. The event service may then select the first identifier 708 from the event and may set the value in the matrix column for the row corresponding to the identifier 710 as described herein at least in connection with FIG. 6 and in accordance with at least one embodiment. Values in the matrix column corresponding to the identifiers may continue being set until there are no more identifiers to set 712. In some embodiments a new event may trigger a decision to update the bitmap 714 and, if the bitmap is to be updated, new entries in one or more bitmaps may be updated 716 as a result of one or more events. In some embodiments, each event may result in an update to one or more bitmaps. In some embodiments, a multitude of events may be collected into an event matrix before one or more bitmaps may be created based at least in part on the event matrix.

Figure 8:
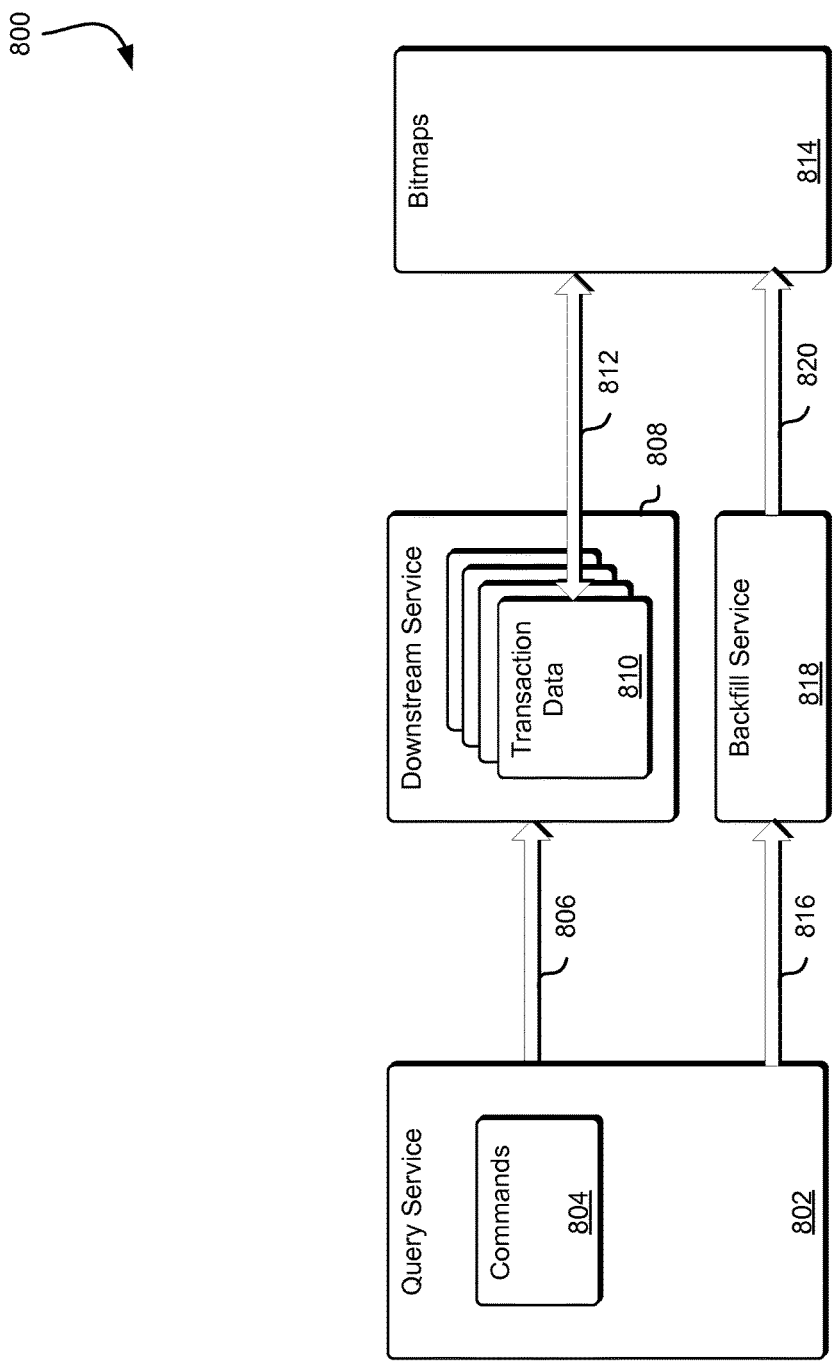
FIG. 8 illustrates an example environment where event gathering commands may be dispatched to downstream services in accordance with at least one embodiment.

FIG. 8 illustrates an example environment 800 where commands or operations may be dispatched to one or more downstream services as described herein at least in connection with FIG. 1 and in accordance with at least one embodiment. A query service 802 may issue one or more commands 804 to one or more downstream services 808. The issued commands 806 may include commands to store, retrieve and/or process the transaction data 810 from the downstream service 808. For example, a downstream service may be gathering transactions and generating a new data log of transactions every hour. The query service 802 may require data from a certain hour, on a certain day from the downstream service and, upon determining that that data has not yet been sent for processing into a bitmap representation, may request that the downstream service 808 send the data for processing 812 to produce bitmaps 814 which may then be used by the query service 802 for analysis. Similarly, the query service may instruct 816 a backfill service 818 to provide 820 additional data related to the transaction data 810 as described herein at least in connection with FIG. 1 and in accordance with at least one embodiment.

Transaction data 810 may include data retrieved from system logs, data stored as a result of previous commands from the query service and/or other such transactional data. Transaction data 810 may be produced from browser plugins, application plugins, application programming interface (API) calls, sensors, monitors, logs and/or other such data gathering services, processes, applications, modules and/or the like. As mentioned herein above, the transaction data may be enhanced by attribute data gathered at the time of the various transactions and may also be later enhanced by attribute data gathered by, for example, the backfill service 818. Additionally, the transaction data 810 and/or the resulting event data may be categorized based on one or more event categories (or event types) to aid in storing, processing and analyzing the data.

Other types of command processing services may be instantiated in connection with the environment 800 illustrated in FIG. 8 to send other types of commands to downstream services. For example, an event dispatching service, where event gathering commands may be dispatched to downstream services may be instantiated. As an example, an event dispatch service may select one or more transactions to gather based on the business value of the transactions and/or other such factors. The transactions to gather may include new transactions, previously gathered transactions and/or a combination of new and previously gathered transactions. The transactions to gather may be chosen based on reasons including, but not limited to, system policies, business decisions, in preparation for system maintenance, in preparation for system outages or other such reasons. The dispatch service may then direct one or more downstream services such as the downstream service 808 to begin gathering transaction data related to the transactions to gather. In some embodiments, a command to begin gathering may instruct the downstream services to gather the specific transactions. In some embodiments, the command to begin gathering may instruct the downstream services 808 to gather at least a subset of all transactions.

In response to the command to begin gathering, one or more downstream services may begin gathering and sending transaction data to a transaction service for processing as described herein at least in connection with FIG. 1. After a number of transactions have been gathered and processed, the dispatch service may select one or more transactions being gathered and may direct the downstream services to stop gathering those transactions. The one or more transactions may include one or more of the transactions previously chosen to gather. In some embodiments, the command to stop gathering may instruct the downstream services to stop gathering specific transactions. In some embodiments, the command to stop gathering may instruct the downstream services to stop gathering all transactions. As a result of the command to stop gathering the transactions, one or more downstream services may continue gathering other transactions until instructed to stop gathering those transactions.

Figure 9:
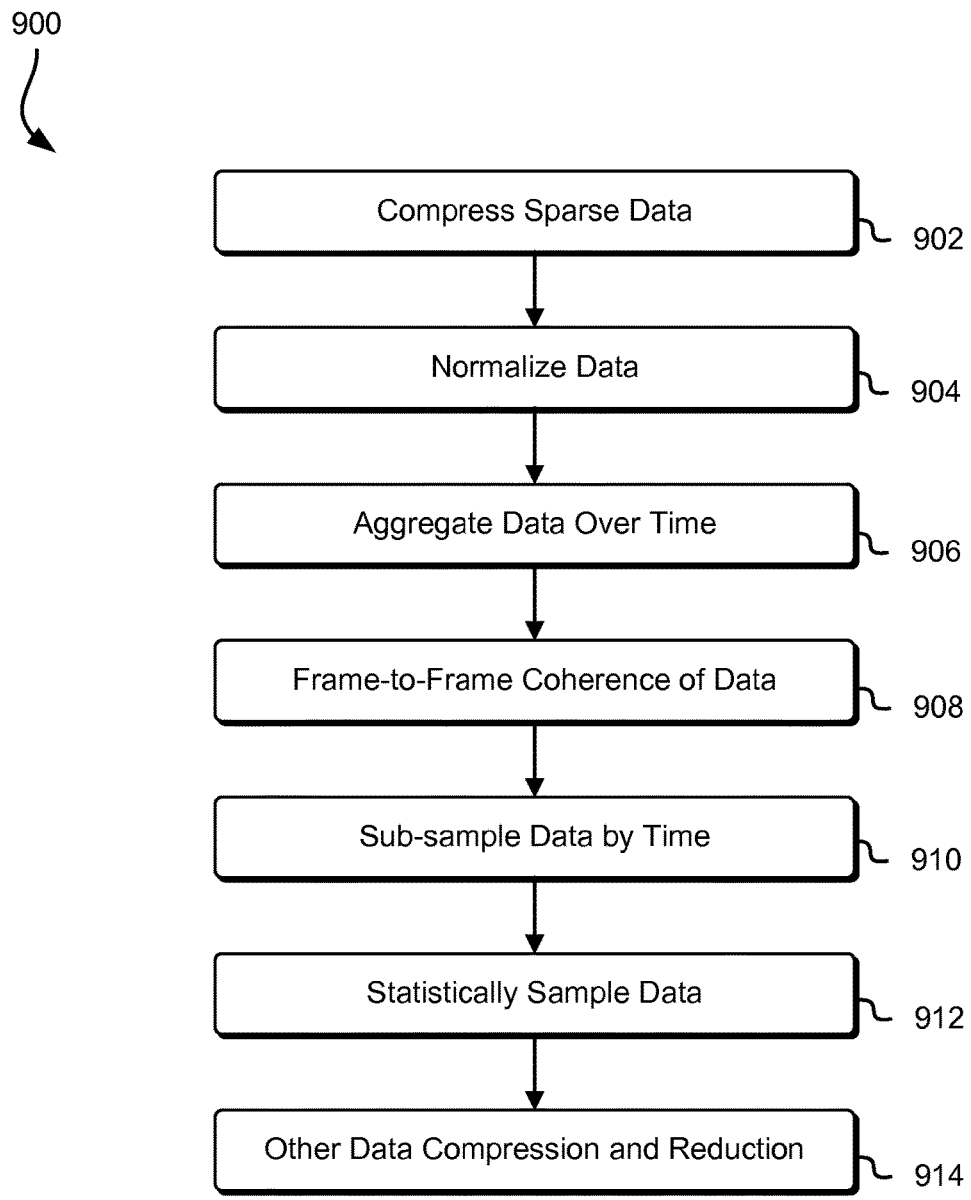
FIG. 9 illustrates an example process for processing bitmaps in accordance with at least one embodiment.

FIG. 9 illustrates an example process 900 for processing bitmaps as described herein at least in connection with FIG. 1 and in accordance with at least one embodiment. A transaction service such as the transaction service 124 described herein at least in connection with FIG. 1 may perform at least a portion of the process illustrated in FIG. 9. An event service such as the event service 132 described herein at least in connection with FIG. 1 may perform at least a portion of the process illustrated in FIG. 9. A query service such as the query service 138 described herein at least in connection with FIG. 1 may perform at least a portion of the process illustrated in FIG. 9. Other entities operating within a computing system may also perform at least a portion of the process illustrated in FIG. 9 including, but not limited to, services, applications, modules, processes, operating system elements, virtual machine elements, network hardware, controlling domains (e.g., a hypervisor) or combinations of these and/or other such entities operating within the computing system.

The bitmap processing service may first process the data in the bitmap by compressing sparse bitmap data 902 using techniques including, but not limited to, run length encoding, coordinate lists, dictionaries, hashes or other such sparse data compression methods. The bitmap processing service may next normalize the bitmap data 904 such as by redistributing more dense and/or otherwise more interesting columns to the beginning of the matrix. The bitmap processing service may next aggregate the bitmap data over time 906 and may use such aggregation to locate patterns within the data, further compress the data and/or other such processing. In some embodiments, the bitmap processing service may also examine the aggregation to determine whether there is any frame-to-frame coherence of the bitmap data 908. The bitmap processing service may also subsample the bitmap data by time 910 and/or may statistically sample the bitmap data 912 to further reduce the data size. As may be contemplated, the order of the bitmap processing operations described herein and/or the type of bitmap processing operations described herein are merely illustrative examples and, as such, other orders of bitmap processing operations as well as other bitmap data compression and/or reduction techniques 914 may be considered as within the scope of the present disclosure.

Figure 10:
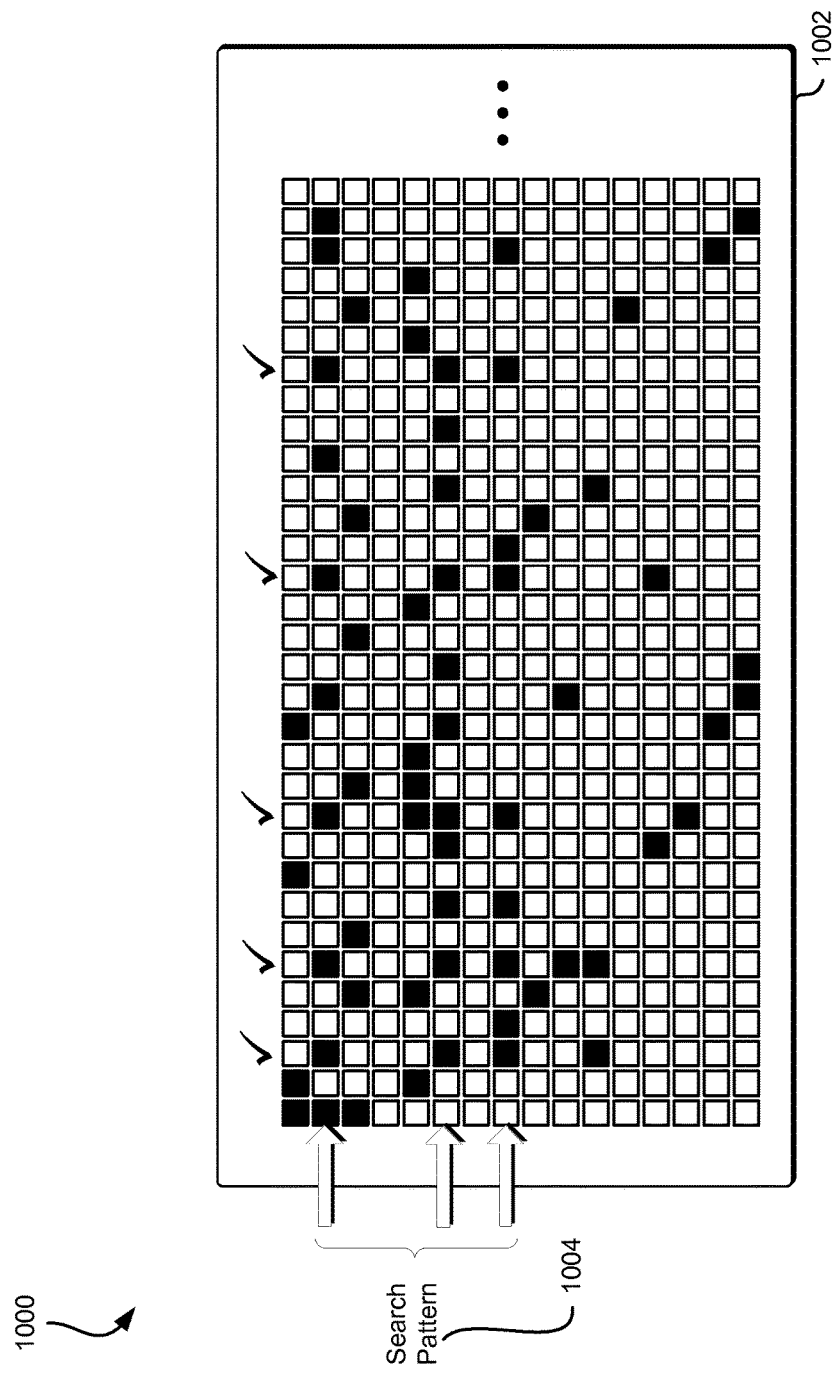
FIG. 10 illustrates an example environment where bitmaps may be searched to locate events in accordance with at least one embodiment.

FIG. 10 illustrates an example environment 1000 where data in a bitmap may be searched to locate events as described herein at least in connection with FIG. 1 and in accordance with at least one embodiment. A bitmap 1002 such as the bitmaps described herein may contain a plurality of columns corresponding to events with bits corresponding to event identifiers. The bitmap 1002 may be a compressed bitmap, or a sampled bitmap, or a statistically sampled bitmap, or a normalized bitmap or a combination of these and/or other such processed bitmaps. A search pattern 1004 may be used to locate events within the bitmap corresponding to one or more unique identifiers associated with one or more name-value pairs. As described herein, the operations on the bitmaps may be fast binary operations doing in-place comparisons of the data. In the example illustrated in FIG. 10, the search pattern 1004 is set to locate events containing the second, sixth and eighth unique identifiers. The pattern of the second, sixth and eighth unique identifiers may correspond to an event that, for example, was originated from a certain device type, in a certain market, for a certain type of user. In the example illustrated in FIG. 10, five of the events collected contain the second, sixth and eighth unique identifiers (indicated by check marks above the event column) and may be of interest. In some embodiments, the five events of interest may be collected into a separate bitmap for further processing such as, for example, to determine whether there are other events that correspond to these events. In the example illustrated in FIG. 10, the five events of interest also each contain the seventh unique identifier, possibly indicating a correspondence between the associated name-value pairs.

Figure 11:
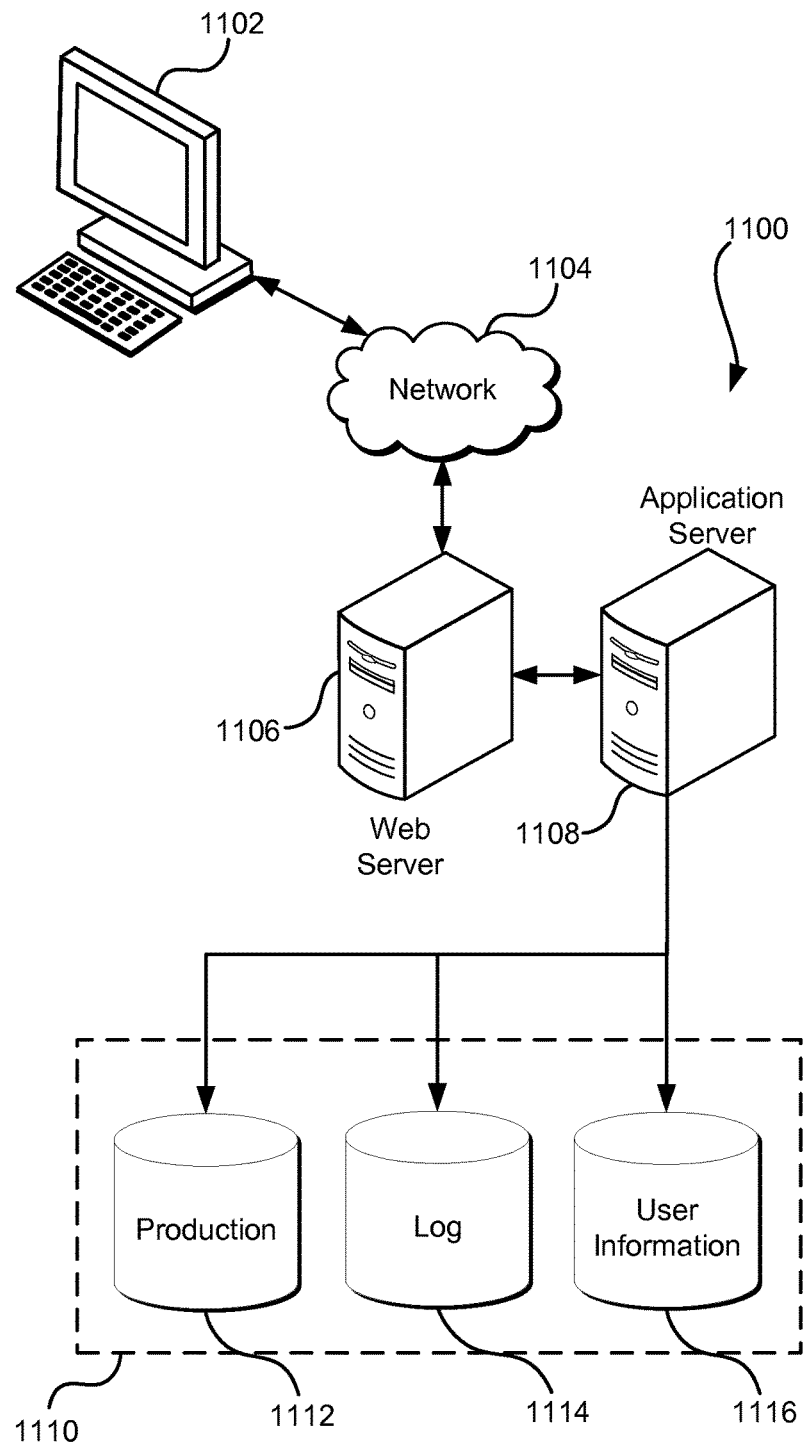
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for tracking a plurality of service attributes, comprising:
under the control of one or more computer systems configured with executable instructions,
receiving one or more transactions by one or more clients to one or more services, the one or more transactions including at least a set of attribute data;
creating, in a name-value pair repository, one or more name-value pair entries that each comprises one or more name-value identifiers and one or more name-value pairs, each of the one or more name-value pairs based at least in part on a first subset of the set of attribute data;
generating a matrix representation of a plurality of events, the matrix representation comprising one or more matrix entries, each matrix entry of the one or more matrix entries corresponding to at least one of the plurality of the name-value identifiers of a corresponding event of the plurality of events;
producing one or more bitmap representations based at least in part on the matrix representation;

performing one or more operations to produce one or more processed bitmap representations based at least in part on one or more of the one or more bitmap representations, the one or more operations including at least one of: compressing one or more of the one or more bitmap representations, normalizing one or more of the one or more bitmap representations, periodically sampling one or more of the one or more bitmap representations, or statistically sampling one or more of the one or more bitmap representations; and analyzing the one or more processed bitmap representations.

2. The computer-implemented method of claim 1, further comprising sending, to one or more of the one or more services, one or more dispatch commands, the one or more dispatch commands including at least one of: start sending transactions, stop sending transactions, retrieve backfill transaction data, scale transaction data, process transaction data, or send transactions based on a set of one or more transaction parameters.

3. The computer-implemented method of claim 1, further comprising issuing an event, wherein issuing the event further comprises instantiating an event entry on an event bus, the event entry based at least in part on the event that was issued, the event bus configured to at least transmit the event that was issued to an event processing service, the event processing service configured to at least generate the matrix representation.

4. The computer-implemented method of claim 1, wherein analyzing the one or more processed bitmap representations using a query service to issue a plurality of queries, the queries based at least in part on one or more of the one or more processed bitmap representations.

5. A system, comprising:
at least one computing device configured to implement one or more services, wherein one or more services in a first subset of the one or more services:
receive one or more transactions by one or more clients to one or more services, the one or more transactions including at least a set of attribute data;
create, in a name-value pair repository, one or more name-value pair entries that each comprises one or more name-value identifiers and one or more name-value pairs, each of the one or more name-value pairs based at least in part on a first subset of the set of attribute data;
generate a matrix representation of a plurality of events, the matrix representation comprising one or more matrix entries, each matrix entry of the one or more matrix entries corresponding to at least one of the plurality of the name-value identifiers of a corresponding event of the plurality of events;
produce one or more bitmap representations based at least in part on the matrix representation;
perform one or more operations to produce one or more processed bitmap representations based at least in part on one or more of the one or more bitmap representations, the one or more operations including at least one of: compressing one or more of the one or more bitmap representations, normalizing one or more of the one or more bitmap representations, periodically sampling one or more of the one or more bitmap representations, or statistically sampling one or more of the one or more bitmap representations; and
analyze the one or more processed bitmap representations.

6. The system of claim 5, wherein the bitmap representation is based at least in part on the name-value identifiers from the one or more of the plurality of events.

7. The system of claim 5, further comprising sending one or more dispatch commands, the one or more dispatch commands including at least one of: start sending transactions, stop sending transactions, retrieve backfill transaction data, scale transaction data, process transaction data, or send transactions based on a set of one or more transaction parameters.

8. The system of claim 5, wherein the system analyzes the bitmap representation using a query service, the query service configured to at least issue a plurality of queries, the plurality of queries based at least in part on the bitmap representation.

9. The system of claim 5, wherein a size individual events of the plurality of events is based at least in part on one or more set limitation values, the set limitation values including at least one of: a length of time, a number of samples, or an aggregate size of data.

10. The system of claim 5, wherein the events in the plurality of events specify one or more event categories.

11. A non-transitory computer-readable storage medium having stored thereon executable instructions that, when executed by one or more processors of a computer system, cause the computer system to at least:
receive one or more transactions by one or more clients to one or more services, the one or more transactions including at least a set of attribute data;
create, in a name-value pair repository, one or more name-value pair entries that each comprises one or more name-value identifiers and one or more name-value pairs, each of the one or more name-value pairs based at least in part on a first subset of the set of attribute data;
generate a matrix representation of a plurality of events, the matrix representation comprising one or more matrix entries, each matrix entry of the one or more matrix entries corresponding to at least one of the plurality of the name-value identifiers of a corresponding event of the plurality of events;
produce one or more bitmap representations based at least in part on the matrix representation;
perform one or more operations to produce one or more processed bitmap representations based at least in part on one or more of the one or more bitmap representations, the one or more operations including at least one of: compressing one or more of the one or more bitmap representations, normalizing one or more of the one or more bitmap representations, periodically sampling one or more of the one or more bitmap representations, or statistically sampling one or more of the one or more bitmap representations; and
analyze the one or more processed bitmap representations.

12. The non-transitory computer-readable storage medium of claim 11, wherein the bitmap representation is based at least in part on the name-value identifiers from the plurality of sets of name-value pair entries.

13. The non-transitory computer-readable storage medium of claim 11, wherein the instructions that cause the computer system to analyze the one or more processed bitmap representations cause the computer system to use a query service, to at least issue a plurality of queries, the plurality of queries based at least in part on the bitmap representation.

14. The non-transitory computer-readable storage medium of claim 11, wherein the one or more operations include comparing one or more name-value pair entries in the matrix representation to one or more target name-value pair entries to at least locate one or more name-value pairs corresponding to one or more of the one or more sets of target name-value pair entries.

15. The non-transitory computer-readable storage medium of claim 11, wherein the one or more operations include removing one or more of the plurality of sets of name-value pair entries from the representation based at least in part on a sampling parameter.

16. The computer-implemented method of claim 1, wherein the matrix representation is indexed by a first index and a second index and wherein each item of a set of items of the first index represents an event from the plurality of events.

17. The system of claim 5, wherein the matrix representation is indexed by a first index and a second index and wherein each item of a set of items of the first index represents an event from the plurality of events.

18. The non-transitory computer-readable storage medium of claim 11, wherein the matrix representation is indexed by a first index and a second index and wherein each item of a set of items of the first index represents an event from the plurality of events.

19. The computer-implemented method of claim 1, wherein each name-value pair of the one or more name-value pairs comprises a name indicating an attribute type and a value comprising a value for the indicated attribute type.

20. The system of claim 5, wherein each name-value pair of the one or more name-value pairs comprises a name indicating an attribute type and a value comprising a value for the indicated attribute type.

* * * * *